US007428513B2

(12) United States Patent
Iima (10) Patent No.: US 7,428,513 B2
(45) Date of Patent: Sep. 23, 2008

(54) INFORMATION-PROCESSING APPARATUS, INFORMATION-PROCESSING METHOD, ACCOUNTING-PROCESSING APPARATUS, ACCOUNTING-PROCESSING METHOD AND RECORDING MEDIUM

(75) Inventor: Shin Iima, Tokyo (JP)

(73) Assignee: Sony Corporation, Tokyo (JP)

( * ) Notice: Subject to any disclaimer, the term of this patent is extended or adjusted under 35 U.S.C. 154(b) by 982 days.

(21) Appl. No.: 09/931,660

(22) Filed: Aug. 16, 2001

(65) Prior Publication Data

US 2002/0021712 A1 Feb. 21, 2002

(30) Foreign Application Priority Data

Aug. 18, 2000 (JP) ............................ P2000-248492

(51) Int. Cl.
*G06F 17/00* (2006.01)
(52) U.S. Cl. ....................................... 705/400; 709/201
(58) Field of Classification Search ........................ None
See application file for complete search history.

(56) References Cited

U.S. PATENT DOCUMENTS 5,819,092 A * 10/1998 Ferguson et al. ............ 717/113
6,035,281 A * 3/2000 Crosskey et al. ............... 705/14
6,119,109 A * 9/2000 Muratani et al. ............ 705/400
6,151,600 A * 11/2000 Dedrick ........................ 707/10
6,738,752 B2 * 5/2004 Sako et al. .................. 705/400

OTHER PUBLICATIONS

Nexpo, II: electronic delivery, output, digital photograph, image databases. (report on Nexpo 1994 conference) (includes color photo insert comparing image quality of output from four digital cameras), Edwards et al, Seybold Report on Publishing Systems, v23, n22, p. 3, Aug. 15, 1994.*

* cited by examiner

*Primary Examiner*—John W. Hayes
*Assistant Examiner*—Rob Wu
(74) *Attorney, Agent, or Firm*—Frommer Lawrence & Haug LLP; William S. Frommer; Thomas E. Presson (57) ABSTRACT

A system that judges which of a number of parties initiates an action to transfer digital data of a content through a network. If the action has been initiated by the party on the reception side, a judgment as to whether the magnitude appended to the digital data of the content is positive or negative. If the magnitude is positive, the party on the reception side is requested to settle accounting for the digital data of the content. If the magnitude is negative, the party on the transmission side settles accounting for the digital data of the content. As a result, it is possible to arbitrarily determine whether a party on the transmission or reception side should bear the cost of a content.

8 Claims, 10 Drawing Sheets

INFORMATION-PROCESSING APPARATUS, INFORMATION-PROCESSING METHOD, ACCOUNTING-PROCESSING APPARATUS, ACCOUNTING-PROCESSING METHOD AND RECORDING MEDIUM

BACKGROUND OF THE INVENTION

In general, the present invention relates to an information-processing apparatus, an information-processing method, an accounting-processing apparatus, an accounting-processing method and a recording medium. More particularly, the present invention relates to an information-processing apparatus, an information-processing method, an accounting-processing apparatus and an accounting-processing method which allow accounting to be settled either on a data-transmitting side or a data-receiving side in a transmission of data through a network, as well as relates to recording media for storing implementations of the information-processing method and the accounting-processing method.

In recent years, a variety of contents such as audio and video data is generally exchanged through the Internet which has been becoming popular.

By the way, the cost or the fee of a content transmission through the conventional Internet is generally borne by the beneficiary. Consider as an example a case in which a content is downloaded from a server to a user. In this case, the cost of the content is borne by the user serving as a recipient of the content without regard to whether the processing to transmit the data is carried out by the server or a terminal receiving the data.

By the way, in the case of a content exchanged among terminals instead of a content downloaded from a server to a terminal, which form a server-terminal pair, it is not necessarily appropriate to charge the cost of the content to a terminal receiving the content. In the conventional system, however, a party supposed to bear the cost of an exchanged content is determined in advance. In some cases, there is thus raised a problem of difficulty to freely set a party supposed to bear the cost of an exchanged content.

SUMMARY OF THE INVENTION

In view of the foregoing, the present invention has been made, and an object of the present invention is to provide a capability of setting a party supposed to bear the cost of an exchanged content with ease as well as with a high degree of reliability and a high degree of freedom.

According to a first aspect of the present invention, there is provided an information-processing apparatus for transmitting data through a network, including judgment means for forming a judgment as to whether an action for transferring data through the network has been taken by a transmission side or a reception side; multiplexing means for multiplexing a positive or negative unit cost per unit data in the data transferred through the network on the basis of a result of the judgment formed by the judgment means; and transmission means for transmitting the data multiplexed with the unit cost by said multiplexing means through the network.

According to a second aspect of the present invention, there is provided an information-processing method for an information-processing apparatus for transmitting data through a network, the method including a judgment step of forming a judgment as to whether an action for transferring data through the network has been taken by a transmission side or a reception side; a multiplexing step of multiplexing a positive or negative unit cost per unit data in the data transferred through the network on the basis of a result of the judgment formed at the judgment step; and a transmission step of transmitting the data multiplexed with the unit cost at the multiplexing step through the network.

According to a third aspect of the present invention, there is provided a recording medium for recording a computer-readable program of an information-processing apparatus for transmitting data through a network, the computer-readable program including a judgment step of forming a judgment as to whether an action for transferring data through the network has been taken by a transmission side or a reception side; a multiplexing step of multiplexing a positive or negative unit cost per unit data in the data transferred through the network on the basis of a result of the judgment formed at the judgment step; and a transmission step of transmitting the data multiplexed with the unit cost at the multiplexing step through the network.

With the information-processing apparatus, the information-processing method, and the program stored in the recording medium according to the present invention, an action for transferring data through the network is determined to be an action taken by a transmission side or a reception side; a positive or negative unit cost per unit data is multiplexed in the data transferred through the network on the basis of a result of the determination; and the data multiplexed with the unit cost is transmitted through the network. As a result, a party on the transmission side is allowed to specify any arbitrary party as a party to bear the cost.

According to a fourth aspect of the present invention, there is provided an accounting-processing apparatus for settling accounting for data exchanged through a network, including judgment means for forming a judgment as to whether an action for transferring data through the network has been taken by a transmission side or a reception side; and accounting means for driving the transmission side or the reception side determined by said judgment means to be a side initiating an action for transferring data through the network to settle accounting for the data transferred through the network.

Preferably, the accounting-processing apparatus may includes first acquisition means for acquiring an amount of data exchanged through the network; and second acquisition means for acquiring a unit price per unit data for data exchanged through the network, wherein the accounting means computes a price of transferred data on the basis of an amount of data acquired by the first acquisition means and a unit price acquired by the second acquisition means.

Preferably, the second acquisition means further may acquire a sign of said unit price, and the accounting means drives the transmission side or the reception side determined to be a side not initiating an action for transferring data through the network to settle accounting in case the sign is negative.

According to a fifth aspect of the present invention, there is provided an accounting-processing method for an accounting-processing apparatus for settling accounting for data exchanged through a network, the method including a judgment step of forming a judgment as to whether an action for transferring data through a network has been taken by a transmission side or a reception side; and an accounting step of driving the transmission side or the reception side determined at the judgment step to be a side initiating an action for transferring data through the network to settle accounting for the data transferred through the network.

According to a sixth aspect of the present invention, there is provided a recording medium for recording a computer-readable program of an accounting-processing apparatus for processing an accounting process of data transmitted through a network, the computer-readable program including a judgment step of forming a judgment as to whether an action for transferring data through the network has been taken by a transmission side or a reception side; and an accounting step of driving the transmission side or the reception side determined at the judgment step to be a side initiating an action for transferring data through the network to settle accounting for the data transferred through the network.

With the accounting-processing apparatus, the accounting-processing method, and the program stored in the other recording medium according to the present invention, an action for transferring data through the network is determined to be an action taken by a transmission side or a reception side; and the transmission side or the reception side determined to be a side initiating an action for transferring data through the network is requested to settle accounting for the data transferred through the network. As a result, even in the case of a content exchanged among individual users, an accounting process can be carried out more logically.

DETAILED DESCRIPTION OF THE PREFERRED EMBODIMENT

Figure 1:
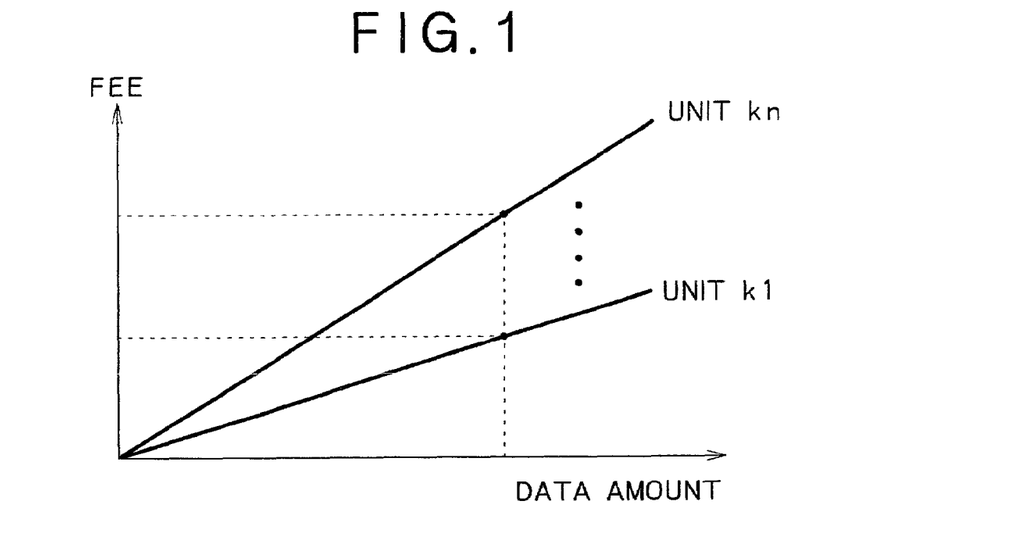
FIG. 1 is an explanatory diagram used for describing a method of calculating the price of a content.

In an embodiment of the present invention, a unit price per unit data is set for a content represented by digital data transmitted through a network which is implemented mainly by the Internet. FIG. 1 is a diagram showing relations of the total price (or the fee) represented by the vertical axis and the amount of transmitted data represented by the horizontal axis for different unit prices. As shown in the figure, even for the same amount of transmitted data, the total price varies in dependence on the unit price. Basically, the unit price for digital data of a content is determined by the type of the content. Thus, even for the same amount of digital data, the total price of the digital data varies from content to content. For the same digital data of content, the total price varies depending on the amount of data.

In addition, in an embodiment of the present invention, as a rule, a party initiating action to transfer data basically settles the accounting of the data. It is normally difficult for a party receiving digital data of a content, however, to add other information to the content. That is to say, the party on the transmission side is the only party capable of adding other information to digital data of a presented content.

For the reason described above, in the embodiment of the present invention, when digital data of a content is exchanged, in order to provide a capability of specifying whether the cost is to be borne by a party on the transmission or reception side, a unit price per unit data as well as a sign of the unit price are transmitted as additional information to the digital data of a content. For a positive (plus) sign, a party initiating the action to transfer the digital data of a content settles the accounting for the content. For a negative (minus) sign, a party not initiating the action to transfer the digital data of a content is requested by the transmission-side party adding the additional information to settle the accounting for the content.

Figure 2:
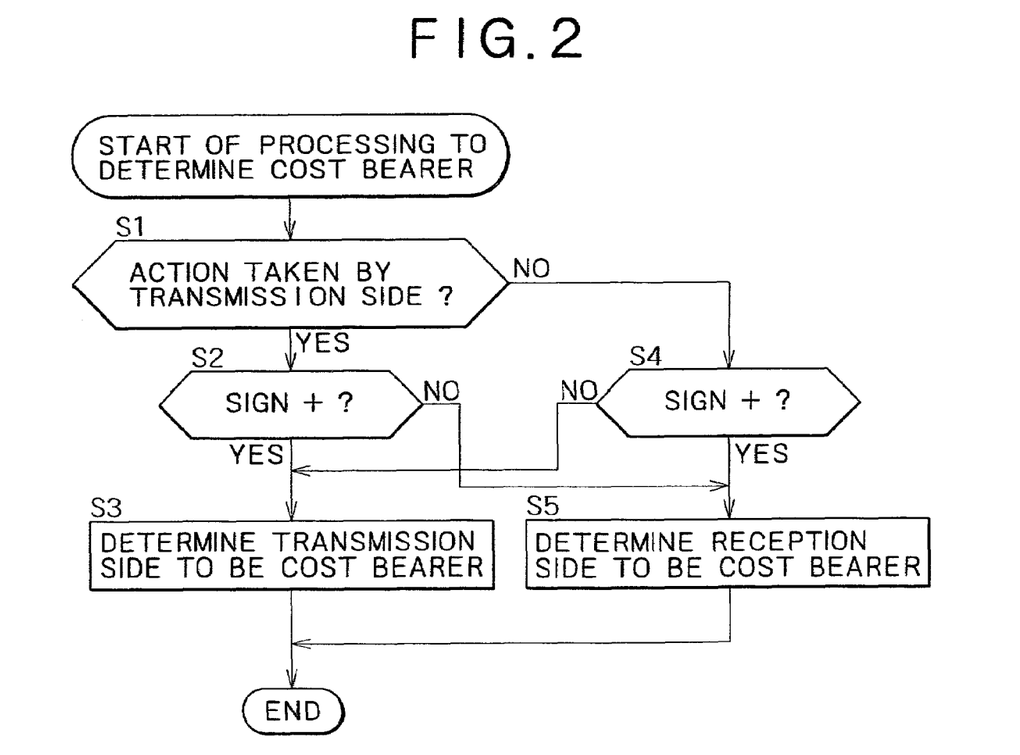
FIG. 2 is a flowchart representing processing to determine whether the cost of a content represented by transferred digital data is to be borne by a party on the transmission or reception side.

FIG. 2 is a flowchart representing processing to determine whether the cost of a content represented by transferred digital data is to be borne by a party on the transmission or reception side as described above.

As shown in the figure, the flowchart begins with a step S1 to form a judgment as to whether an action to transfer digital data of a content through a network has been initiated by a party on the transmission or reception side. If the action has been initiated by the party on the transmission side, the flow of the processing goes on to a step S2 to form a judgment as to whether the sign appended as a prefix to a unit price per unit data added to the digital data of the content is positive (plus) or negative (minus). If the sign is positive, the flow of the processing goes on to a step S3 at which the party on the transmission side is requested to settle accounting for the digital data of the content.

If the outcome of the judgment formed at the step S2 indicates that the sign appended as a prefix to a unit price per unit data added to the digital data of the content is not positive, that is, negative (minus), on the other hand, the flow of the processing goes on to a step S5 at which the party on the reception side is requested to settle accounting for the digital data of the content.

If the outcome of the judgment formed at the step S1 indicates that the action has not been initiated by the party on the transmission side but initiated by the party on the reception side, on the other hand, the flow of the processing goes on to a step S4 to form a judgment as to whether the sign appended as a prefix to a unit price per unit data added to the digital data of the content is positive (plus) or negative (minus). If the sign is positive, the flow of the processing goes on to a step S5 at which the party on the reception side is requested to settle accounting for the digital data of the content. If the outcome of the judgment formed at the step S4 indicates that the sign appended as a prefix to a unit price per unit data added to the digital data of the content is not positive, that is, negative (minus), on the other hand, the flow of the processing goes on to a step S3 at which the party on the transmission side settles accounting for the digital data of the content.

Figure 3:
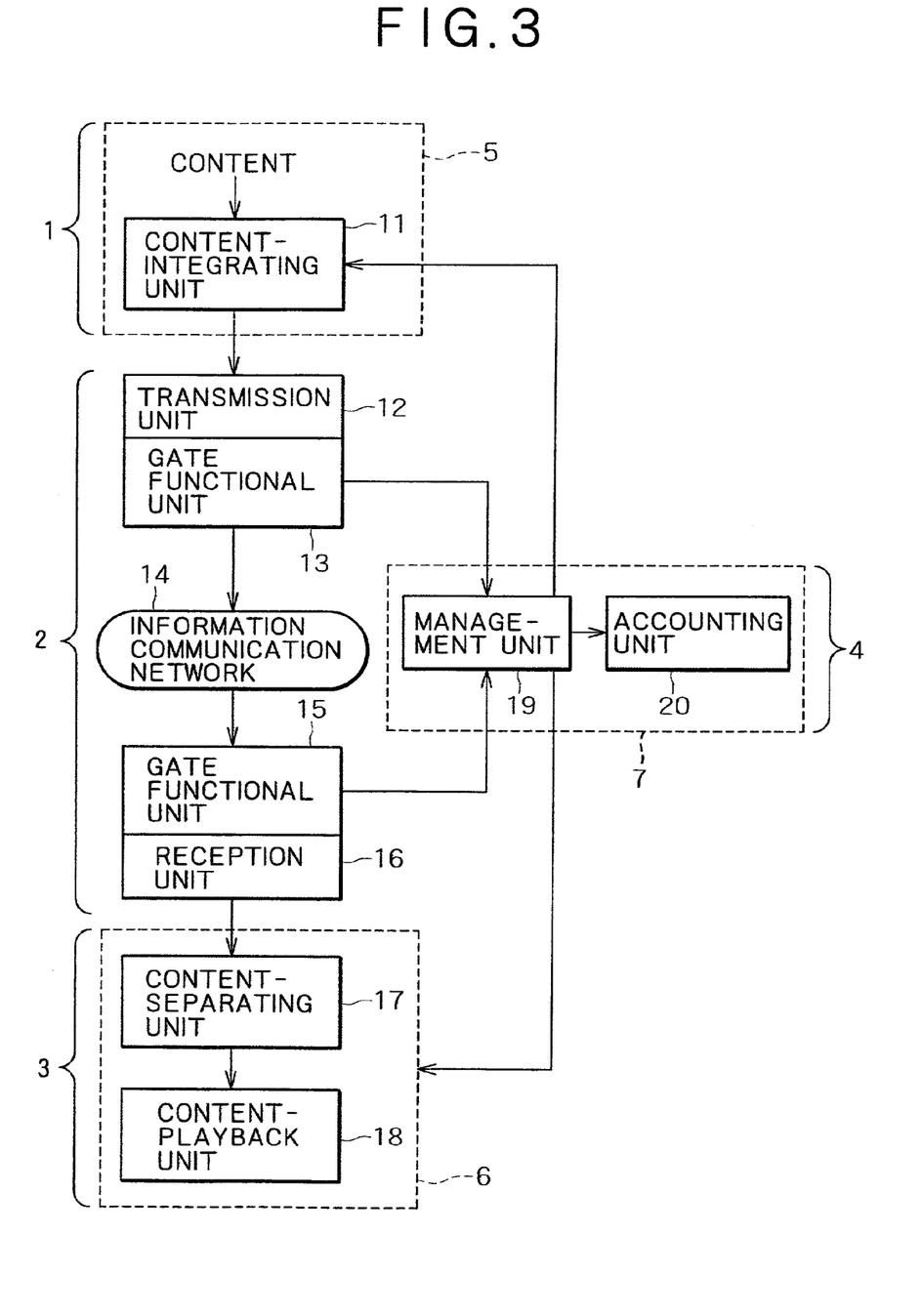
FIG. 3 is a block diagram showing a typical configuration of a content-digital-data-transferring system applying the present invention.

The following describes a typical configuration of a content-digital-data-transferring system applying the present invention by referring to FIG. 3.

An information-transmitting apparatus 5 implemented typically by a server or a personal computer is operated by an information sender 1. The information-transmitting apparatus 5 has a content-integrating unit 11. Components ranging from a transmission unit 12 to a reception unit 16 are managed by a communication business enterprise 2. An information-receiving apparatus 6 is a terminal implemented by typically a personal computer operated by an information recipient. The information-receiving apparatus 6 includes a content-separating unit 17 and a content playback unit 18. A fee-collecting server 7 is managed by a fee collection service business enterprise 4. The fee-collecting server 7 comprises a management unit 19 and an accounting unit 20.

The content-integrating unit 11 adds information on a unit value per unit data amount to digital data of a content for each predetermined unit data amount, and supplies the information and the digital data to the transmission unit 12.

To put it concretely, for example, a packet of digital data of a content is taken as the unit data amount. In this case, information on the price of a packet is added to the header of each packet which is then supplied to the transmission unit 12. If the information on a value is information showing a unit price per unit data amount or the amount of money for the unit data and the unit value can be determined by the management unit 19, the amount of money itself is included in the header of each packet. As an alternative, the information on a value can be included in the header as information on an attribute of the content represented by digital data. Examples of the attribute of a content are the type and the quality of the content. In this case, the management unit 19 includes a table showing a relation between the information on an attribute and the price.

The transmission unit 12 receives a content's digital data including additional information on a value per unit data amount from the content-integrating unit 11, and converts the digital data into data with a predetermined format conforming to a predetermined protocol so that the data obtained as a result of the conversion matches an information communication network 14. The information communication network 14 passes on the data to the reception unit 16.

A gate functional unit 13 employed in the transmission unit 12 extracts information on a communication concerning digital data of the content to be transmitted to the information communication network 14. The gate functional unit 13 supplies the information on a communication to the management unit 19. The information on a communication includes an added value, the amount of data being transmitted, a communication time, the information sender 1 and the information recipient 3.

On the other hand, a gate functional unit 15 employed in the reception unit 16 extracts information on a communication concerning digital data of the content being received from the information communication network 14. The other gate functional unit 15 supplies the information on a communication to the management unit 19. The information on a communication includes an added value, the amount of data being received, a communication time, the information sender 1 and the information recipient 3.

It should be noted that processing of the gate functional unit 13 and the other gate functional unit 15 can be carried out at the same time as transfers of digital data representing contents. As an alternative, processing of the gate functional unit 13 and the other gate functional unit 15 can be carried out to accumulate information on communications for a predetermined period of time to be supplied to the management unit 19 as a batch.

The reception unit 16 restores digital data of a content received from the information communication network 14 in accordance with a predetermined protocol and supplies data obtained as a result of conversion to the content-separating unit 17.

The content-separating unit 17 takes out additional information on a value from the digital data of the content before supplying the digital data to the content playback unit 18. The content playback unit 18 plays back the digital data of the content received from the content-separating unit 17 with the additional information on a value removed.

The management unit 19 collates the information on a communication received from the gate functional unit 13 employed in the transmission unit 12 with the information on a communication received from the other gate functional unit 15 employed in the reception unit 16 in order to confirm that digital data of a content has been supplied by the information sender 1 to the information recipient 3. The confirmation can also be based on the information on a communication received from either the other gate functional unit 15 or the gate functional unit 13. The management unit 19 then computes a sales price for the digital data of the content from information on a value and an amount of data, which are included in the information on the communication. Typically, the sales price is a product of the unit price and the amount of data. Finally, the management unit 19 supplies the sales price to the accounting unit 20.

In addition, the management unit 19 transmits information on utilization of the digital data representing the content and information on accounting for the digital data to the information-transmitting apparatus 5 and the information-receiving apparatus 6.

The accounting unit 20 carries out an accounting process based on the sales price received from the management unit 19 for the information sender 1 and the information recipient 3.

The following describes a series of processes for transmitting digital data of a content from the information sender 1 to the information recipient 3 and share the cost of transmitting the digital data among the information sender 1, the information recipient 3 and the communication business enterprise 2.

Figure 4:
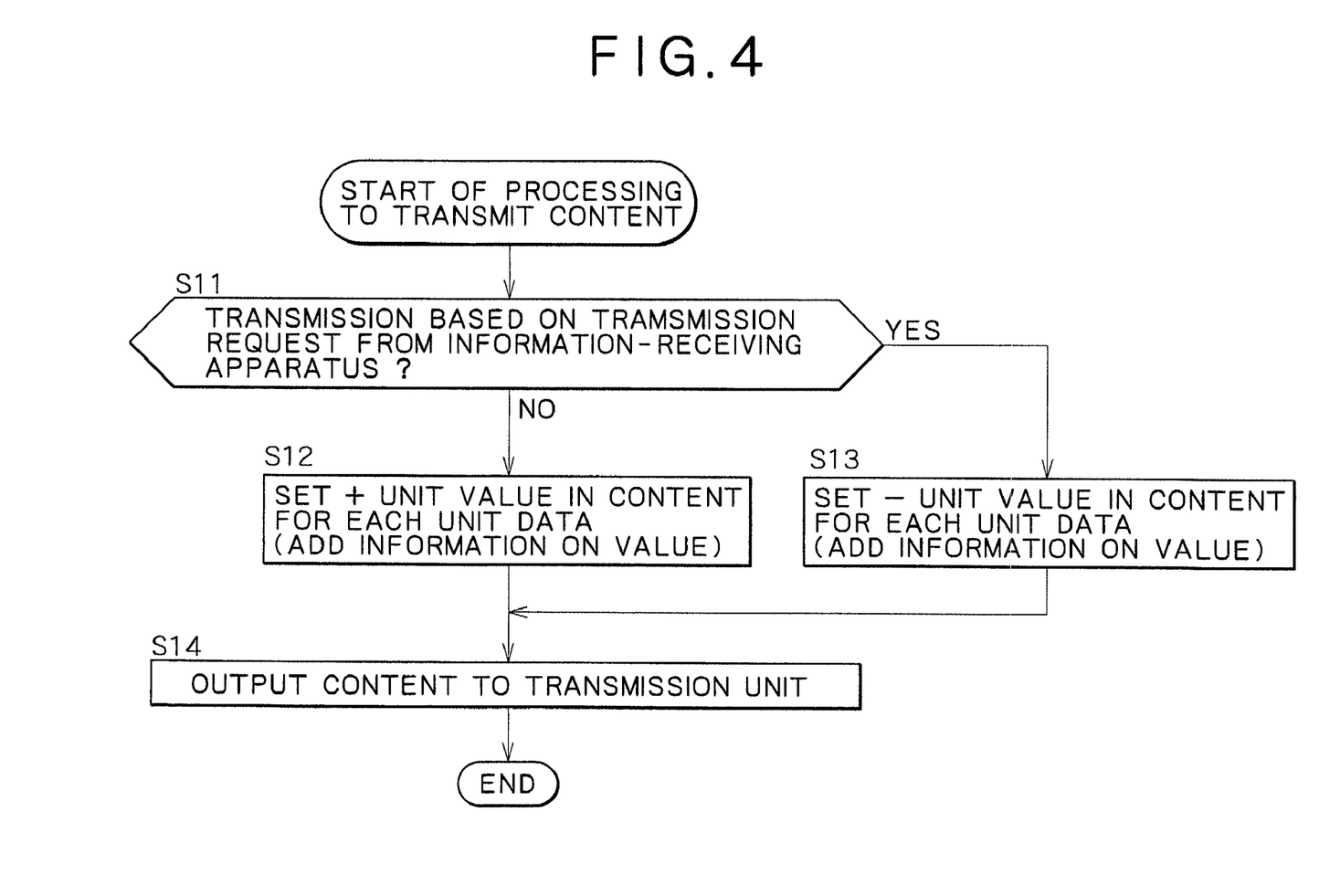
FIG. 4 is a flowchart representing content transmission processing.

The description begins with an explanation of processing carried out by the information-transmitting apparatus 5 managed by the information sender 1 to transmit a content with reference to a flowchart shown in FIG. 4.

As shown in FIG. 4, the flowchart begins with a step S11 at which the information-transmitting apparatus 5 forms a judgment as to whether or not a transmission of a content is based on a request for the transmission received from the information-receiving apparatus 6 operated by the information recipient 3. If the outcome of the judgment indicates that the transmission of a content is not based on a request from for the transmission received from the information-receiving apparatus 6, that is, based on a request for the transmission received from the information-transmitting apparatus 5, the flow of the processing goes on to a step S12.

At the step S12, the information-transmitting apparatus 5 reads out the requested content from a storage unit and the content-integrating unit 11 adds information on a positive (plus: +) value to the content for each unit data amount. At the next step S14, the content-integrating unit 11 supplies the digital data of the content including the additional information on the positive value to the transmission unit 12.

If the outcome of the judgment formed at the step S11 indicates that the transmission of a content is based on a request from for the transmission received from the information-receiving apparatus 6, on the other hand, the flow of the processing goes on to a step S13. At the step S13, the information-transmitting apparatus 5 reads out the requested content from the storage unit and the content-integrating unit 11 adds information on a negative (minus: −) value to the content for each unit data amount. At the next step S14, the content-integrating unit 11 supplies the digital data of the content including the additional information on the negative value to the transmission unit 12.

Figure 5:
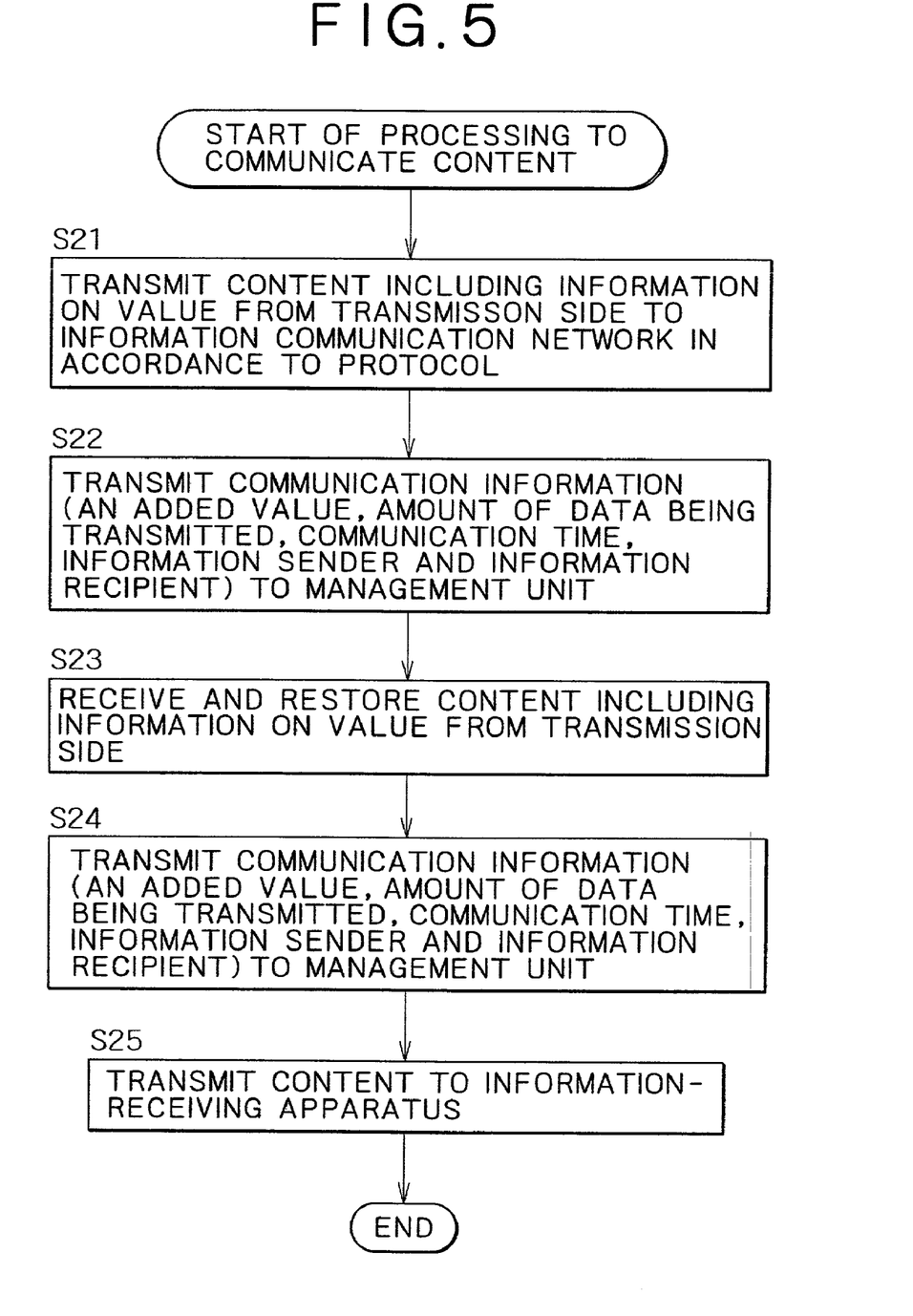
FIG. 5 is a flowchart representing content communication processing.

The following describes processing carried out by the components ranging from the transmission unit 12 to the reception unit 16, which are managed by the communication business enterprise 2, to communicate the content by referring to a flowchart shown in FIG. 5.

As shown in the figure, the flowchart begins with a step S21 at which the transmission unit 12 converts the digital data of the content including the additional information on the value and coming from the information-transmitting apparatus 5 into data with a predetermined format conforming to a predetermined protocol so that the data obtained as a result the conversion matches an information communication network 14. The transmission unit 12 then supplies the data to the reception unit 16 by way of the information communication network 14.

At the next step S22, the gate functional unit 13 employed in the transmission unit 12 extracts information on a communication concerning digital data of the content to be transmitted to the information communication network 14. The gate functional unit 13 supplies the information on a communication to the management unit 19. The information on a communication includes an added value including a sign, the amount of data being transmitted, a communication time, the information sender 1 and the information recipient 3.

At the next step S23, the reception unit 16 restores digital data of a content received from the information communication network 14 in accordance with a predetermined protocol. At the next step S24, the other gate functional unit 15 employed in the reception unit 16 extracts information on a communication concerning digital data of the content being received from the information communication network 14. The other gate functional unit 15 supplies the information on a communication to the management unit 19. The information on a communication includes an added value including a sign, the amount of data being received, a communication time, the information sender 1 and the information recipient 3.

At the next step S25, the reception unit 16 supplies the content's digital data restored at the step S23 to the information-receiving apparatus 6.

Figure 6:
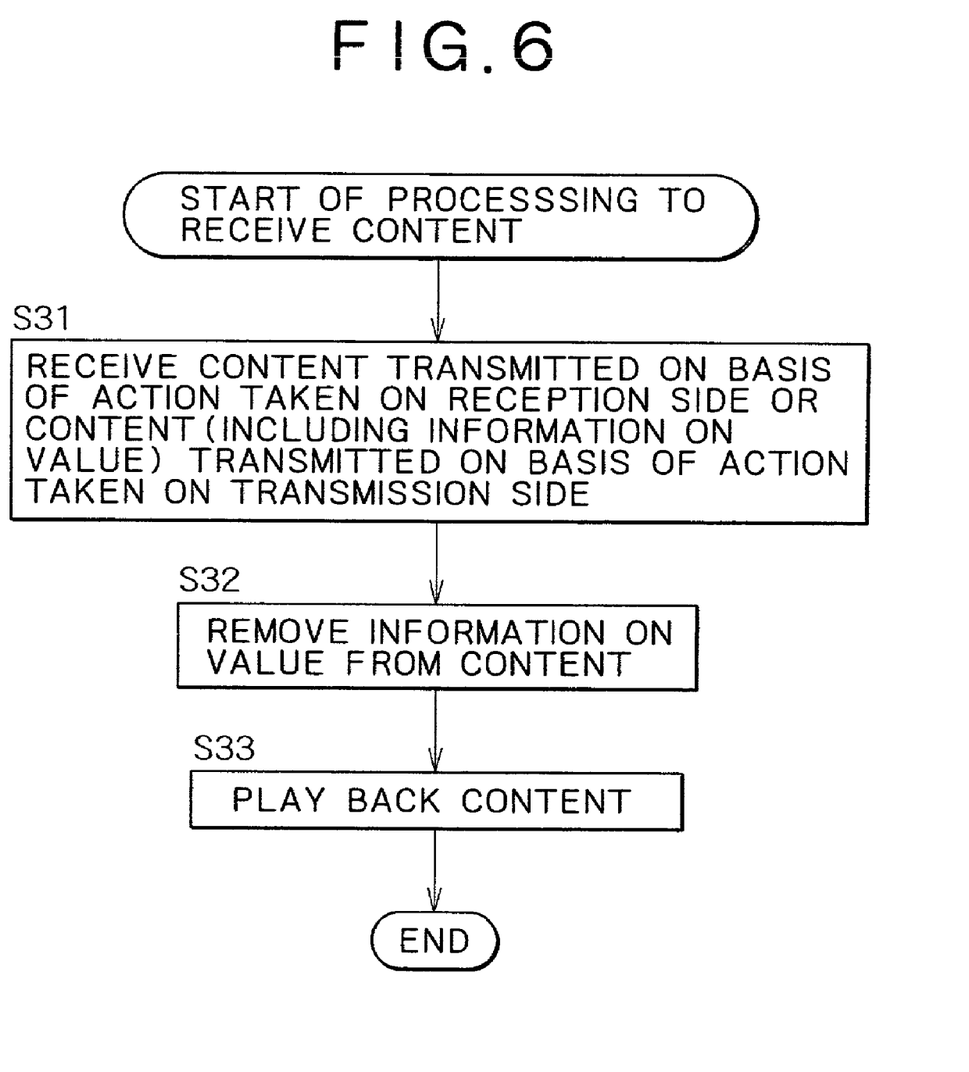
FIG. 6 is a flowchart representing content reception processing.

The following describes processing carried out by the content-separating unit 17 and the content playback unit 18, which constitute the information-receiving apparatus 6, to utilize a content by referring to a flowchart shown in FIG. 6.

As shown in the figure, the flowchart begins with a step S31 at which the information-receiving apparatus 6 issues a request for a transmission of digital data of a content to the information-transmitting apparatus 5. In response to this request, the information-transmitting apparatus 5 transmits the digital data of the content to the information-receiving apparatus 6 as described above.

At the same step S31, the content-separating unit 17 employed in the information-receiving apparatus 6 receives the digital data of a content transmitted by an action initiated by the information-receiving apparatus 6 or an action initiated by the information-transmitting apparatus 5 from the receiving unit 16.

At the next step S32, the content-separating unit 17 takes out additional information on a value from the digital data of the content received at the step S31 and supplies the digital data to the content playback unit 18.

At the next step S33, the content playback unit 18 plays back the digital data of the content received from the content-separating unit 17 with the additional information on a value removed.

Figure 7:
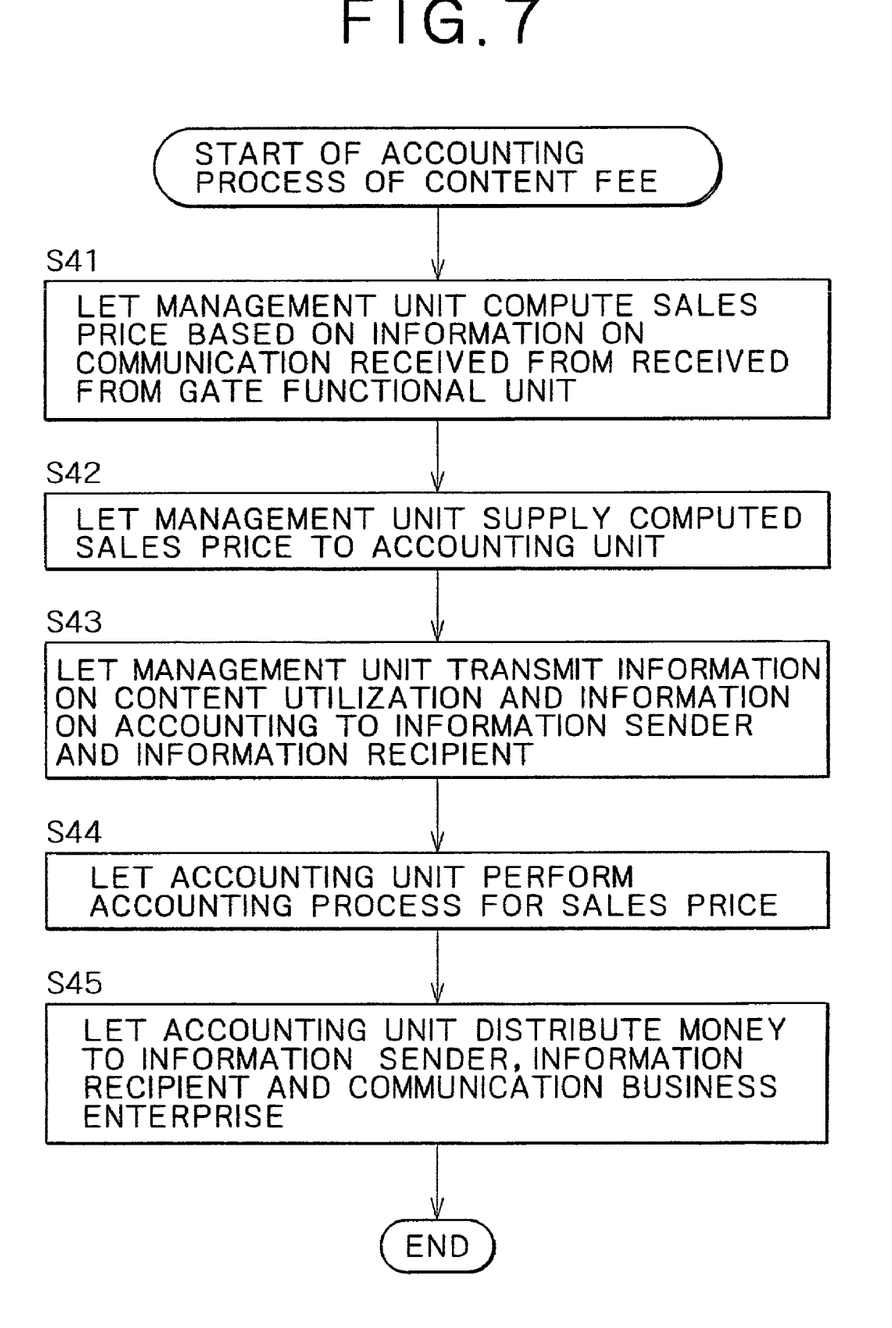
FIG. 7 is a flowchart representing a content-fee accounting process.

The following describes processing carried out by the management unit 19 and the accounting unit 20, which constitute the fee-collecting server 7 managed by the fee collection service business enterprise 4, to carry out an accounting process to compute a fee for a content by referring to a flowchart shown in FIG. 7.

As shown in the figure, the flowchart begins with a step S41 at which the management unit 19 collates the information on a communication received from the gate functional unit 13 employed in the transmission unit 12 with the information on a communication received from the other gate functional unit 15 employed in the reception unit 16 in order to confirm that digital data of a content has been supplied by the information sender 1 to the information recipient 3. The management unit 19 then computes a sales price for the digital data of the content from a unit price or information on a value and an amount of data received by the information-receiving apparatus 6 or an amount of data transmitted by the information-transmitting apparatus 5. The unit price and the amount of data are included in the information on the communication. Typically, the sales price is a product of the unit price and the amount of data. The management unit 19 also computes a communication fee based on the amount of data and a communication time.

At the next step S42, the management unit 19 synthesizes the sales price and the communication fee, which have been computed at the step S41, and supplies a result of the synthesis to the accounting unit 20 as information on accounting.

In addition, at the next step S43, the management unit 19 transmits information on utilization of the digital data representing the content and the information on accounting for the digital data to the information-transmitting apparatus 5 and the information-receiving apparatus 6.

At the next step S44, the accounting unit 20 carries out an accounting process based on the information on accounting received from the management unit 19 at the step S42 for the information sender 1 or the information recipient 3. To put it concretely, a bill including the sales price and the communication fee is sent to the information sender 1 or the information recipient 3.

At the next step S45, the accounting unit 20 delivers money received from the information sender 1 or the information recipient 3 at the step S44 to a proper party in accordance with a contract made among the information sender 1, the information recipient 3 and the communication business enterprise 2.

That is to say, the accounting unit 20 determines a party to pay the price of the content in accordance with the processing represented by the flowchart shown in FIG. 2. If the content has been transmitted in accordance with a will of the information sender 1 and the sign of the price is positive, the information sender 1 is determined to be a party to bear the cost of the content. If the sign of the price is negative, on the other hand, the information recipient 3 is determined to be a party to bear the cost of the content.

If the content has been transmitted in accordance with a will of the information recipient 3 and the sign of the price is positive, the information recipient 3 is determined to be a party to bear the cost of the content. If the sign of the price is negative, on the other hand, the information sender 1 is determined to be a party to bear the cost of the content.

Since the money collected from either the information sender 1 or the information recipient 3 covers the price of a content and a communication fee, the communication fee is paid to the communication business enterprise 2.

In the example shown in FIG. 3, the information sender 1 transmits a content to the information recipient 3. It should be noted, however, that there is also a case in which the information recipient 3 serves as an information sender while the information sender 1 serves as an information recipient.

The unit price and the sign of the unit price may vary from content to content. In such a case, the accounting unit 20 computes a payment amount typically as is shown in FIG. 8.

Figure 8:
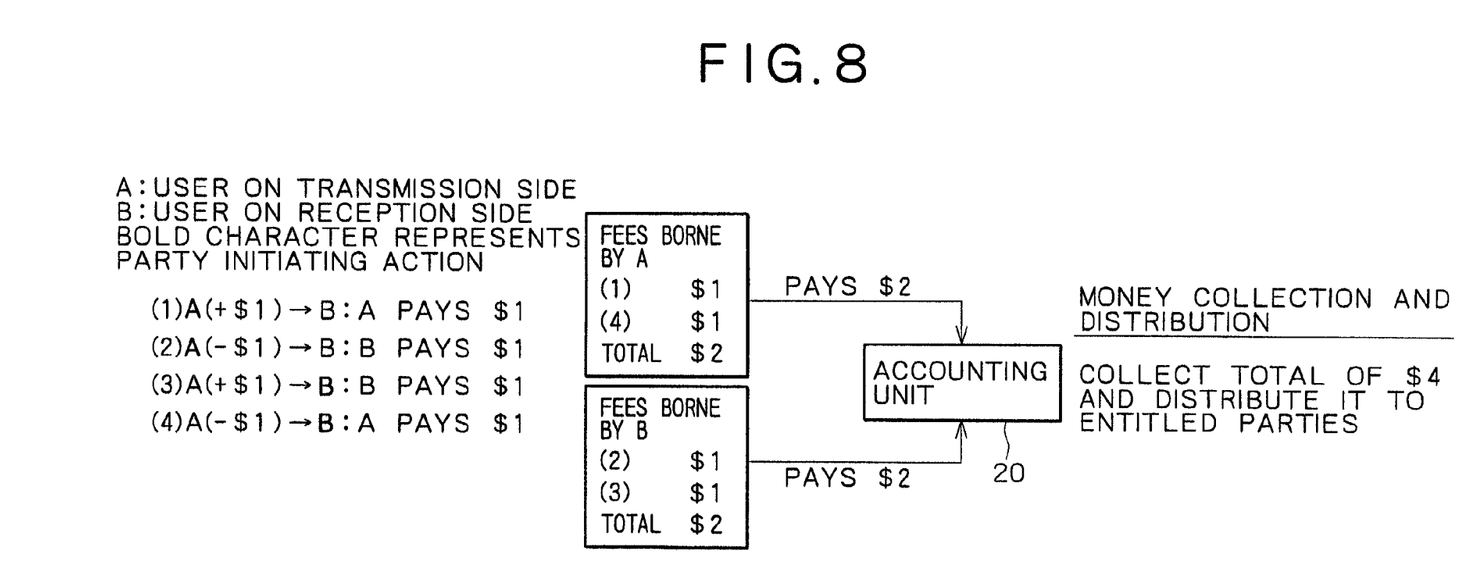
FIG. 8 is a diagram showing an example of content payments.

In an example shown in FIG. 8, user A on the transmission side transmits two contents to user B on the reception side as a result of actions initiated by user A itself. The two contents are a first content with a price of +$1 and a second content with a price of −$1. In addition, user B receives a third content with a price of +$1 and a fourth content with a price of −$1 from user A as a result of actions initiated by user B itself.

In this case, user A bears a cost of $1 for the first content and a cost of $1 for the fourth content, paying a total price of $2 to the fee collection service business enterprise 4. On the other hand, user A bears a cost of $1 for the second content and a cost of $1 for the third content, paying a total price of $2 to the fee collection service business enterprise 4. The accounting unit 20 employed in the fee collection service business enterprise 4 receives $2 from user A and $2 from user B. Then, the accounting unit 20 distributes $2 of the collected money of $4 to user A and the remaining $2 to user B. It should be noted that, in this case, a portion allocated to the communication business enterprise 2 is omitted to make the explanation simpler.

Figure 9:
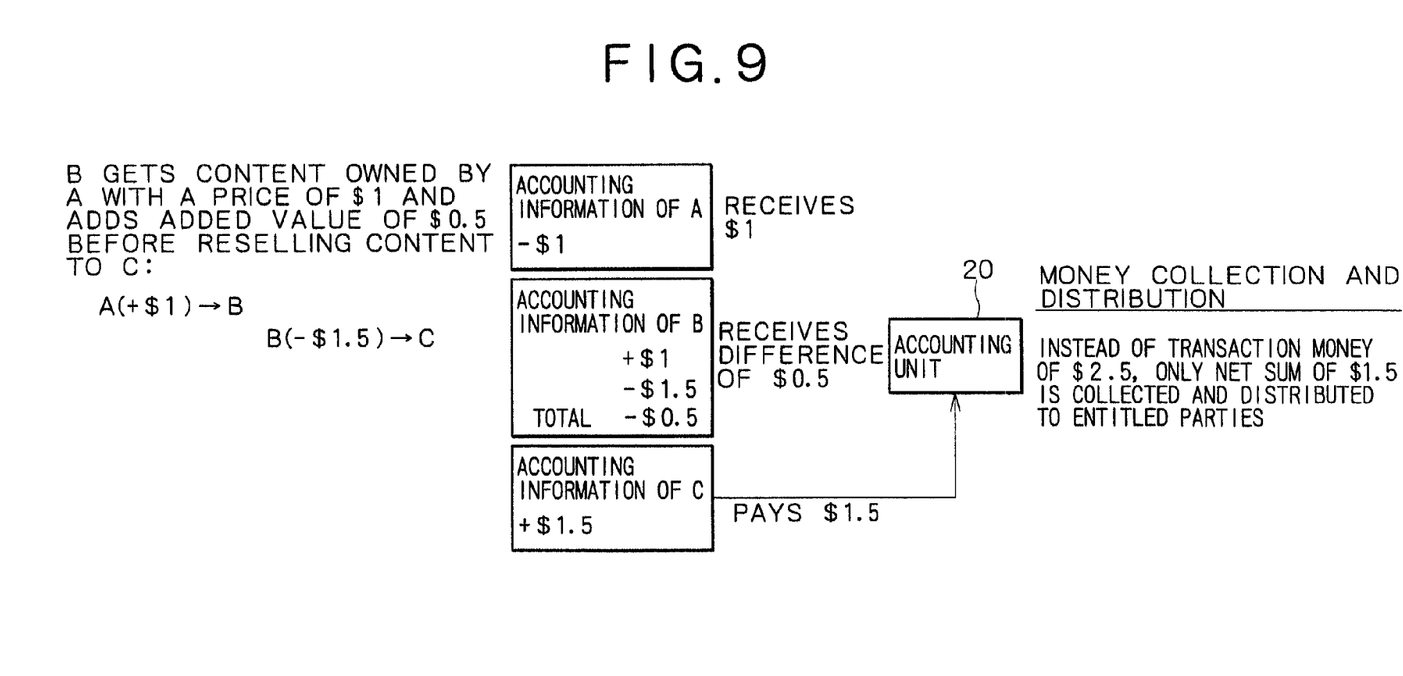
FIG. 9 is a diagram showing another example of content payments.

In the example shown in FIG. 8, an accounting process is carried out in a simple manner and payments are just collected from users. If a user pays as well as receives fees, however, a difference between fees to be paid and to be received may be computed. FIG. 9 is a diagram showing a case in which a difference between a fee to be paid and a fee to be received may be computed.

In the example shown in FIG. 9, user B receives a content with a price of +$1 from user A as a result of an action initiated by user B itself. User B also sends a content with a price of −$1.5 to user C as a result of an action initiated by user B itself.

In this case, user A is entitled to a payment of $1, user C bears a cost of $1.5 and, as a result, user B is entitled to a difference of $0.5.

Thus, the accounting unit 20 receives $1.5 from user C and apportions $1 to user A and $0.5 to user B.

If the calculation of differences is applied to the example shown in FIG. 8, user A bears a cost of $2 as well as is entitled to a fee of $2. In the same way, user B bears a cost of $2 as well as is entitled to a fee of $2. As a result, the accounting unit 20 receives money from neither user A nor user B and apportions money to neither user A nor user B.

Figure 10:
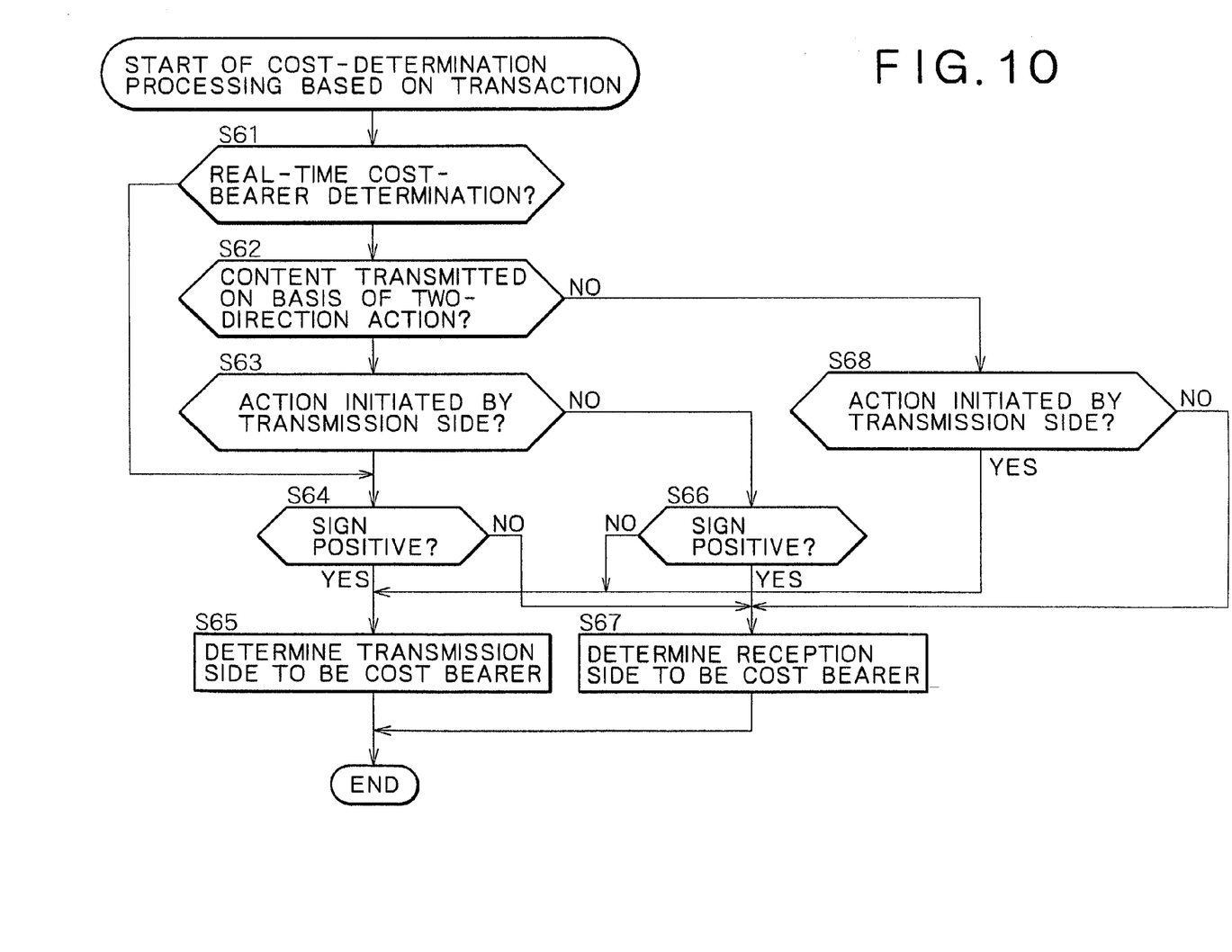
FIG. 10 is a flowchart representing processing of determining a party to bear a cost on the basis of a transaction.

FIG. 10 is a flowchart representing a principle of determining a party to bear a cost on the basis of transactions made in an actual network system. As shown in the figure, the flowchart begins with a step S61 to form a judgment as to whether or not a transaction subjected to the determination is a transaction requiring determination of a party to bear a cost in a real-time manner. If the transaction subjected to the determination is not a transaction requiring determination of a party to bear a cost in a real-time manner, the flow of the processing goes on to a step S64 to form a judgment as to whether the sign appended as a prefix of the unit price to the content is positive or negative. If the sign is positive, the flow of the processing goes on to a step S65 at which the party on the transmission side is determined to be the party to bear the cost. If the sign is negative, on the other hand, the flow of the processing goes on to a step S67 at which the party on the reception side is determined to be the party to bear the cost.

The transaction described above is a transaction for which a party to bear a cost is determined in advance or cataloged in advance.

If the outcome of the judgment formed at the step S61 indicates that the transaction subjected to the determination is a transaction requiring determination of a party to bear a cost in a real-time manner, on the other hand, the flow of the processing goes on to a step S62 to form a judgment as to whether or not the content is transmitted on the basis of a two-direction action. If the transaction is a transaction wherein the content is transmitted not on the basis of a two-direction action, that is, the content is transmitted on the basis of a one-direction action, the flow of the processing goes on to a step S68 to form a judgment as to whether or not the action was initiated by the party on the transmission side. If the action was initiated by the party on the transmission side, the flow of the processing goes on to the step S65 at which the party on the transmission side is determined to be the party to bear the cost. If the action was initiated by the party on the reception side, on the other hand, the flow of the processing goes on to the step S67 at which the party on the reception side is determined to be the party to bear the cost.

The transaction described above is a transaction for which a party starting the communication such as an email communication through a server is the party to bear the cost.

It is logically possible to determine a party to bear a cost of a content on the basis of a result of a judgment as to whether the sign appended as a prefix to the unit price of the content is positive or negative regardless of whether the outcome of the judgment formed at the step S68 indicates that the action was initiated by the party on the transmission or reception side. In a system transmitting a content as a result of an action in a one-side direction, however, the party on the reception side is determined to be a party to bear the cost if the outcome of the judgment formed at the step S68 indicates that the action was initiated by the party on the transmission side and the sign appended as a prefix to the unit price of the content is negative. On the other hand, the party on the transmission side is determined to be a party to bear the cost if the outcome of the judgment formed at the step S68 indicates that the action was initiated by the party on the reception side and the sign appended as a prefix to the unit price of the content is negative. However, a system rendering such a service does not conform to the common sense of society.

If the outcome of the judgment formed at the step S62 indicates that the transaction is a transaction wherein the content is transmitted on the basis of a two-direction action, on the other hand, the flow of the processing goes on to a step S63 to form a judgment as to whether the action was initiated by the transmission or reception side. If the action was initiated by the transmission side, the flow of the processing goes on to the step S64 to form a judgment as to whether the sign appended as a prefix of the unit price to the content is positive or negative. If the sign is positive, the flow of the processing goes on to the step S65 at which the party on the transmission side is determined to be the party to bear the cost. If the sign is negative, on the other hand, the flow of the processing goes on to the step S67 at which the party on the reception side is determined to be the party to bear the cost.

If the outcome of the judgment formed at the step S63 indicates that the action was initiated by the reception side, on the other hand, the flow of the processing goes on to a step S66 to form a judgment as to whether the sign appended as a prefix of the unit price to the content is positive or negative. If the sign is negative, the flow of the processing goes on to the step S65 at which the party on the transmission side is determined to be the party to bear the cost. If the sign is positive, on the other hand, the flow of the processing goes on to the step S67 at which the party on the reception side is determined to be the party to bear the cost.

As described above, by appending a negative sign as a prefix to the unit price of a content, a party on a side opposite to a side initiating an action can be determined to be a party to bear the cost of the content.

A series of processes described above can be carried out by using hardware or by execution of software. In the case of software execution, the information-transmitting apparatus 5 is implemented by a personal computer having a configuration shown in FIG. 11.

Figure 11:
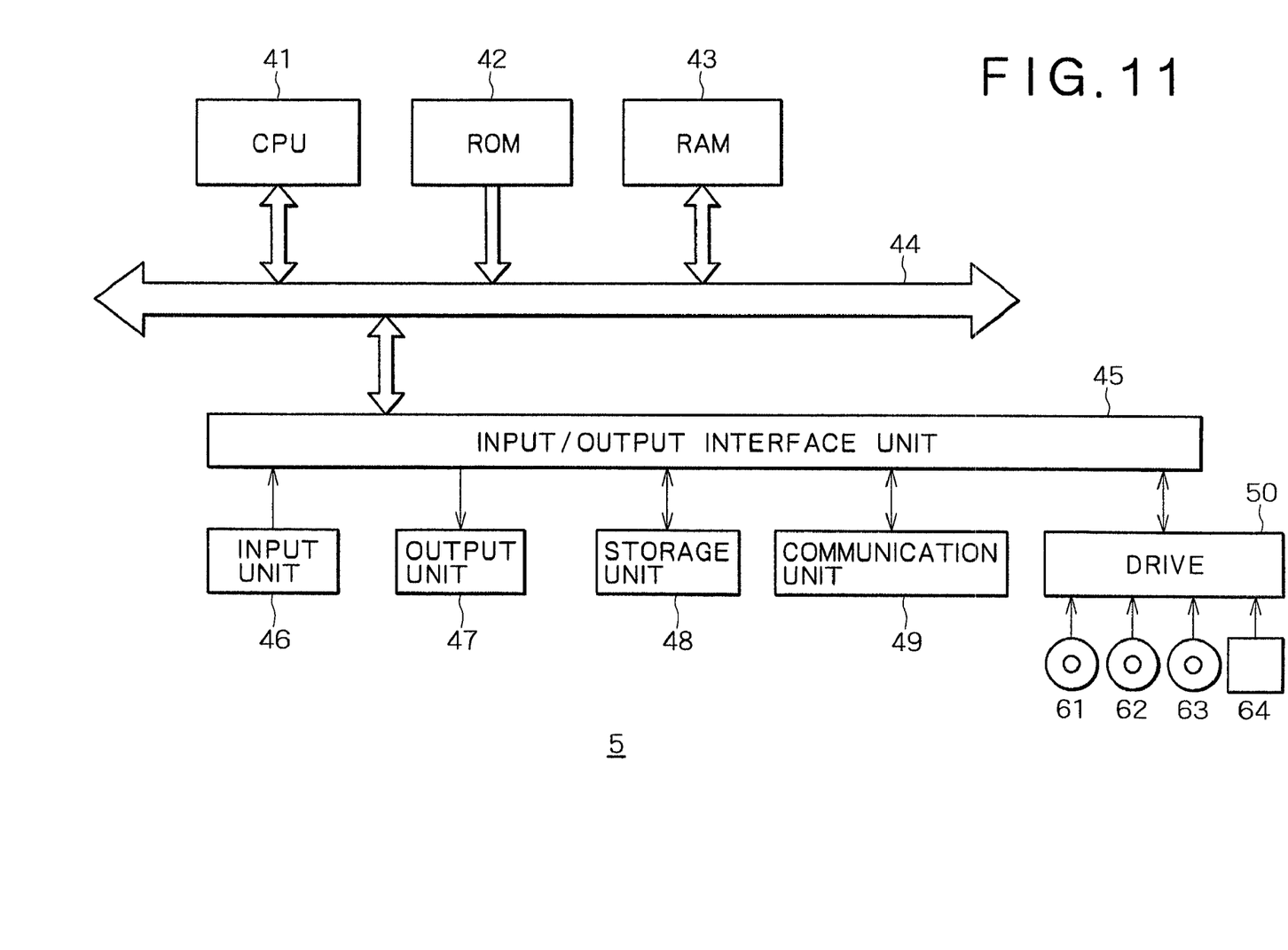
FIG. 11 is a block diagram showing a typical configuration of a information-transmitting apparatus employed in the content-digital-data-transferring system shown in FIG. 3.

In the personal computer shown in FIG. 11, a CPU (Central Processing Unit) 41 carries out various kinds of processing by execution of programs stored in advance in a ROM (Read-Only Memory) 42 or programs loaded from the storage unit 48 into a RAM (Random-Access Memory) 43. The RAM 43 is also used for appropriately storing data required during execution of the processing.

The CPU 41, the ROM 42 and the RAM 43 are connected to each other by a bus 44 that is also connected to an I/O interface unit 45.

The I/O interface unit 45 is connected to an input unit 46, an output unit 47, a storage unit 48 and a communication unit 49. The output unit 47 includes a keyboard and a mouse. The output unit 47 includes a display unit such as a CRT or an LCD unit and a speaker. The communication unit 49 comprises a modem and a terminal adapter. The communication unit 49 carries out communications through a network such as the Internet.

If necessary, the I/O interface unit 45 is connected to a drive 50 for mounting a magnetic disc 61, an optical disc 62, a magneto-optical disc 63 or a semiconductor memory 64. A computer program is read out from the magnetic disc 61, the optical disc 62, the magneto-optical disc 63 or the semiconductor memory 64 and installed into the storage unit 48 if necessary.

If the series of processes is carried out by execution of software, the information-receiving apparatus 6, the management unit 19 and the accounting unit 20 can each also be configured in the same way as the information-transmitting apparatus 5.

If the series of processes is carried out by execution of software, programs composing the software are installed in a computer embedded in special-purpose hardware or typically a general-purpose personal computer from a network or a recording medium. A general-purpose personal computer is a personal computer capable of carrying out a variety of functions by execution a variety of programs installed therein.

As shown in FIG. 11, a recording medium for presenting a program to the user is distributed separately from the main unit of the apparatus. In order to present a program to the user, however, the use of package media is not mandatory. As mentioned before, examples of the package media are the magnetic disc 61 including a floppy disc, the optical disc 62 including a CD-ROM (Compact-Disc Read-Only Memory) and a DVD (Digital Versatile Disc), the magneto-optical disc 63 including an MD (Mini Disc) and the semiconductor memory 64. As an alternative, a program can also be presented to the user by incorporating the program in the main unit of the apparatus in advance. That is to say, the program is stored in the ROM 42, a hard disc included in the storage unit 48 or the like.

It should be noted that, in this specification, while steps prescribed in a program recorded in a recording medium can of course be executed sequentially along the time axis in an order the steps are prescribed in the program, the steps are not always executed sequentially along the time axis. That is to say, a program may include steps that are executed concurrently or individually.

In addition, the technical term 'system' used in this specification means the whole equipment comprising a plurality of apparatuses.

While a preferred embodiment of the invention has been described using specific terms, such description is for illustrative purpose only, and it is to be understood that changes and variations may be made without departing from the spirit or scope of the following.

What is claimed is:

1. An information-processing apparatus for transmitting data through a network, comprising:

judgment means for forming a judgment as to which of at least two parties initiated an action for transferring one or more data units through said network;

multiplexing means for multiplexing a unit cost per unit data and a first magnitude for each data unit in said data transferred through said network when said judgment means judges that the action was initiated by a first party and for multiplexing a unit cost per unit data and a second magnitude for each data unit in said data transferred through said network when said judgment means judges that the action was initiated by a second party, wherein when the judgment is formed that the first party initiated an action for transferring one or more data units through said network and the first magnitude is positive, a cost is beared by the first party, wherein when the judgment is formed that the first party initiated an action for transferring one or more data units through said network and the first magnitude is negative, a cost is beared by the second party, wherein when the judgment is formed that the second party initiated an action for transferring one or more data units through said network and the first magnitude is positive, a cost is beared by the second party, wherein when the judgment is formed that the second party initiated an action for transferring one or more data units through said network and the first magnitude is negative, a cost is beared by the first party;

transmission means for transmitting said data multiplexed with said unit cost by said multiplexing means through said network, wherein the transmitted data is comprised of a plurality of data units, each of which comprises an associated magnitude.

2. An information-processing method for information-processing apparatus for transmitting data through a network, said method comprising:

a judgment step of forming a judgment as to which of at least two parties initiated an action for transferring one or more data units through said network;

a multiplexing step of multiplexing a unit cost per unit data and a first magnitude for each data unit in said data transferred through said network when said judgment formed by said judgment means judges that the action was initiated by a first party and for multiplexing a unit cost per unit data and a second magnitude for each data unit in said data transferred through said network when said judgment formed by said judgment means judges that the action was initiated by a second party, wherein when the judgment is formed that the first party initiated an action for transferring one or more data units through said network and the first magnitude is positive, a cost is beared by the first party, wherein when the judgment is formed that the first party initiated an action for transferring one or more data units through said network and the first magnitude is negative, a cost is beared by the second party, wherein when the judgment is formed that the second party initiated an action for transferring one or more data units through said network and the first magnitude is positive, a cost is beared by the second party, wherein when the judgment is formed that the second party initiated an action for transferring one or more data units through said network and the first magnitude is negative, a cost is beared by the first party;

a transmission step of transmitting said data multiplexed with said unit cost at said multiplexing step through said network, wherein the transmitted data is comprised of a plurality of data units, each of which comprises an associated magnitude.

3. A recording medium for recording a computer-readable program of an information-processing apparatus for transmitting data through a network, said computer-readable program comprising:

a judgment step of forming a judgment as to which of at least two parties initiated an action for transferring one more data units through said network;

a multiplexing step of multiplexing a unit cost per unit data and a first magnitude in said data transferred through said network when said judgment formed by said judgment means judges that the action was initiated by a first party and for multiplexing a unit cost per unit data and a second magnitude in said data transferred through said network when said judgment formed by said judgment means judges that the action was initiated by a second party, wherein when the judgment is formed that the first party initiated an action for transferring one or more data units through said network and the first magnitude is positive, a cost is beared by the first party, wherein when the judgment is formed that the first party initiated an action for transferring one or more data units through said network and the first magnitude is negative, a cost is beared by the second party, wherein when the judgment is formed that the second party initiated an action for transferring one or more data units through said network and the first magnitude is positive, a cost is beared by the second party;

wherein when the judgment is formed that the second party initiated an action for transferring one or more data units through said network and the first magnitude is negative, a cost is beared by the first party;

a transmission step of transmitting said data multiplexed with said unit cost at said multiplexing step through said network, wherein the transmitted data is comprised of a plurality of data units, each of which comprises an associated magnitude.

4. An accounting-processing apparatus for settling accounting for data exchanged through a network, comprising:

judgment means for forming a judgment as to which of at least two parties initiated an action for transferring one or more data units through said network by determining if a first magnitude or a second magnitude is multiplexed in said data, wherein when the judgment is formed that the first party initiated an action for transferring one or more data units through said network and the first magnitude is positive, a cost is beared by the first party, wherein when the judgment is formed that a first party initiated an action for transferring one or more data units through said network and the first magnitude is negative, a cost is beared by the second party, wherein when the judgment is formed that a second party initiated an action for transferring one or more data units through said network and the first magnitude is positive, a cost is beared by the second party, wherein when the judgment is formed that the second party initiated an action for transferring one or more data units through said network and the first magnitude is negative, a cost is beared by the first party;

accounting means for determining the party determined by said judgment means to be a side initiating an action for transferring the one or more data units through said network to settle accounting for said data transferred through said network, wherein the transferred data is comprised of a plurality of data units, each of which comprises an associated magnitude.

5. An accounting-processing apparatus according to claim 4, further comprising:

first acquisition means for acquiring an amount of data exchanged through said network; and second acquisition means for acquiring a unit price per unit data for data exchanged through said network, wherein said accounting means computes a price of transferred data on the basis of an amount of data acquired by said first acquisition means and a unit price acquired by said second acquisition means.

6. An accounting-processing apparatus according to claim 4 wherein said second acquisition means further acquires a sign of said unit price, and said accounting means drives said transmission side or said reception side determined to be a side not initiating an action for transferring data through said network to settle accounting in case said sign is negative.

7. An accounting-processing method for an accounting-processing apparatus for settling accounting for data exchanged through a network, said method comprising:

a judgment step of forming a judgment as to which of at least two parties initiated an action for transferring one or more data units through a network by determining if a first magnitude or a second magnitude is multiplexed in said one or more data units, wherein when the judgment is formed that a first party initiated an action for transferring one or more data units through said network and the first magnitude is positive, a cost is beared by the first party, wherein when the judgment is formed that a first party initiated an action for transferring one or more data units through said network and the first magnitude is negative, a cost is beared by the second party, wherein when the judgment is formed that the second party initiated an action for transferring one or more data units through said network and the first magnitude is positive, a cost is beared by the second party, wherein when the judgment is formed that the second party initiated an action for transferring one or more data units through said network and the first magnitude is negative, a cost is beared by the first party;

an accounting step of determining the party determined at said judgment step to be a side initiating an action for transferring the one or more data units through said network to settle accounting for said data transferred through said network, wherein the transferred data is comprised of a plurality of data units, each of which comprises an associated magnitude.

8. A recording medium for recording a computer-readable program of an accounting-processing apparatus for processing an accounting process of data transmitted through a network, said computer-readable program comprising:

a judgment step of forming a judgment as to which of at least two parties initiated an action for transferring one or more data units through said network by determining if a first magnitude or a second magnitude is multiplexed in said one or more data units, wherein when the judgment is formed that a first party initiated an action for transferring one or more data units through said network and the first magnitude is positive, a cost is beared by the first party, wherein when the judgment is formed that the first party initiated an action for transferring one or more data units through said network and the first magnitude is negative, a cost is beared by the second party, wherein when the judgment is formed that a second party initiated an action for transferring one or more data units through said network and the first magnitude is positive, a cost is beared by the second party, wherein when the judgment is formed that the second party initiated an action for transferring one or more data units through said network and the first magnitude is negative, a cost is beared by the first party;

an accounting step of determining the party determined at said judgment step to be a side initiating an action for transferring the one or more data units through said network to settle accounting for said data transferred through said network, wherein the transferred data is comprised of a plurality of data units, each of which comprises an associated magnitude.

* * * * *